United States Patent
Dorschel

[15] 3,675,607
[45] July 11, 1972

[54] METHOD AND APPARATUS FOR CONTROLLING DEPTH OF SUBMERGENCE OF AN UNDERWATER VEHICLE

[72] Inventor: Jurgen Dorschel, Oberhausen, Germany

[73] Assignee: Deutsche Babcoak & Wilcox Aktiengesellschaft, Oberhausen, Germany

[22] Filed: Feb. 25, 1970

[21] Appl. No.: 13,900

[30] Foreign Application Priority Data

Feb. 27, 1969 Germany..................P 19 09 823.8

[52] U.S. Cl. ..........................................114/16 R, 61/69 R
[51] Int. Cl. .............................................................B63g 8/00
[58] Field of Search ..................114/16, 16 E; 61/69; 9/8 R

[56] References Cited

UNITED STATES PATENTS 3,543,526  12/1970  O'Neill et al. ...................114/016 R
3,500,648  3/1970  Daniell..............................114/016 R Primary Examiner—Trygve M. Blix
Attorney—Bryan, Parmelee, Johnson & Bollinger

[57] ABSTRACT

A method and apparatus for controlling the depth of submergence of an underwater vehicle is described. The vehicle is formed of two separate components. A first component is a submergible main housing enclosing human life sustaining quarters in open pressure communication with a surrounding body of water. The second component is in the form of a submergible depth control body of a predetermined underwater weight. The depth control body is suspended from the house with a retractable cable. The submergible housing is provided with tanks whose air to water ratio is controlled to bring the buoyancy of the housing below the underwater weight of the depth control body. Precise depth control of the underwater housing is obtained by controlling the length of the cable. The life sustaining quarters of the vehicle are supported with material, such as fresh water or electrical storage batteries and the like, stored in a container in the second component.

16 Claims, 1 Drawing Figure

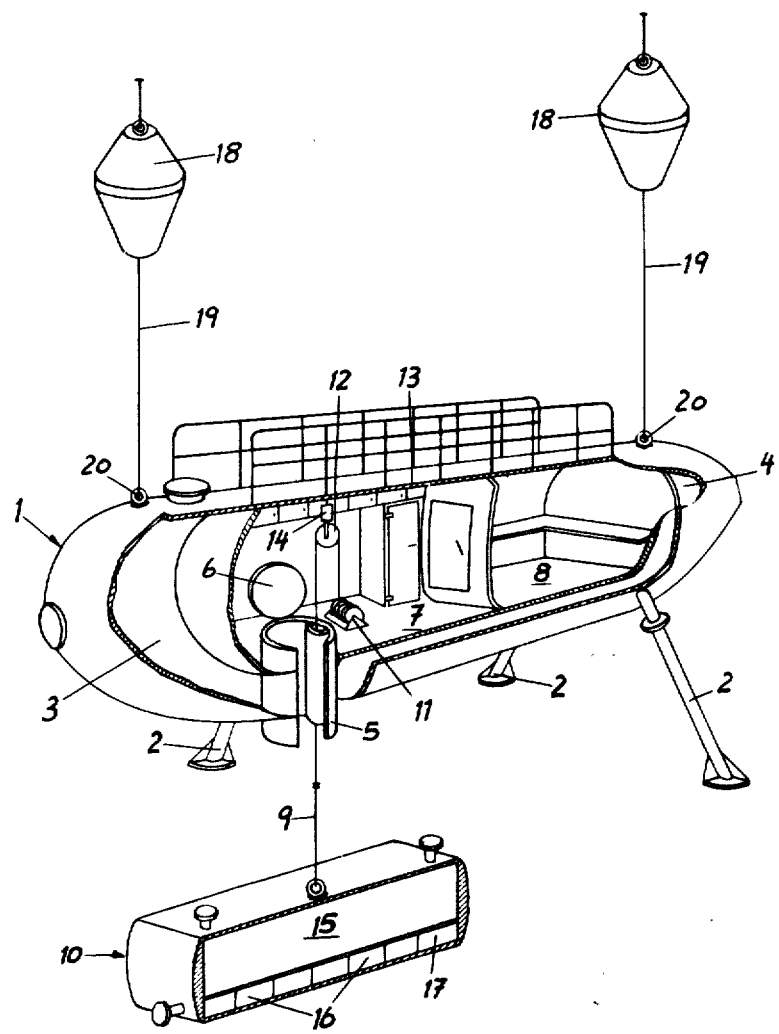

METHOD AND APPARATUS FOR CONTROLLING DEPTH OF SUBMERGENCE OF AN UNDERWATER VEHICLE

This invention relates to an underwater vehicle. Specifically, this invention relates to a method and apparatus for raising and lowering an underwater vehicle such as a submergible house in a controlled manner below the surface of a body of water.

Vehicles, in the form of a submergible house, are known and serve as a location for research on the sea bottom. A submergible house is lowered to the sea bottom at a selected location, where it is solidly and securely anchored with suitably constructed legs. Inside a submergible vehicle of the open type the air pressure is approximately the same as the pressure of the surrounding water. As a result the thickness of the walls of the house, contrary to what has been done up till now, need not be constructed to withstand the absolute water pressure but only a small pressure differential. In effect, the life sustaining quarters inside the submergible house are in open pressure communication with the surrounding body of water.

Although the construction of such so-called open submergible vehicles are simpler than those of the absolute pressure-resistant type, the raising and lowering of an open vehicle must take place slowly and must be accurately controlled in view of the fact that the quantity and pressure of air inside the open vehicle depends on its depth below the water surface. After an open vehicle is submerged a slight rise, even if small, results in a loss of air and a slight drop requires the addition of air from compressed air bottles. The air bottles may contain suitable mixtures of other gases than normal air.

It is often desirable to stop the descent or ascent of an open vehicle from the surface of the sea or from the sea bottom at selected depths, in order to check on currents, salt contents of water, etc. However, regulation of the depth during descent and ascent is customarily obtained by the flooding of ballast tanks, i.e. by controlling the air to water ratio in the ballast tanks. This type of vertical control of a submergible house involves a considerable technical effort and energy.

It is, therefore, an object of the invention to provide a method and apparatus for controlling the raising and lowering of submergible vehicle in a simple and accurate manner.

In accordance with a preferred embodiment of the invention the submergible vehicle is formed of two components. A first component includes an open housing having life sustaining quarters and a second component has the form of a depth control body with containers for holding materials to support the quarters in the first component. The second component has a predetermined underwater weight. The depth control body is suspended by means of a cable or the like from a winch located in the open house to effect relative movements between them. Vertical position control of the first component is enhanced by sensing the tension in the cable between the first and second components and by varying the cable length in response to an indication of the sensed tension.

When the submergible house reaches the sea bottom, its ballast tanks are filled to provide sufficient weight to keep the legs of the house securely settled on the sea bottom. As a result, the second component is not used as a depth control body while the house is firmly settled. The described embodiment of the invention provides the second component with a floodable container. Potable water may be stored in the container so that the second component serves the additional function as a fresh water supply.

The depth control body itself requires, even when its wall thickness is considered, an additional negative buoyancy, i.e. ballast. With a flooding volume of e.g. 1 m³ and a wall thickness of 8 mm the depth control body provides a significant buoyancy when filled with air and downward force of 1 ton (metric) when filled with water. Since the anchor stone's fresh water holding container of the second component may be emptied while on the ocean bottom, more than 1 ton (metric) extra ballast is needed to keep it there. Instead of using deadweight ballast, the described embodiment of the invention utilizes electrical batteries for ballast of the second component. Advantageously, a battery charging device may be added as ballast to recharge the depleted batteries when sea surface conditions are sufficiently calm to permit this.

A further feature of an embodiment of the invention relates to the use of one or more so-called depth limiting bodies connected to the underwater house by cables or the like to impart upward forces to the house. These depth limiting bodies ensure that the vehicle remains in an upright position and the distance between the depth limiting bodies and the vehicle determines the depth to which the vehicle will sink.

Further advantages and characteristics of the device according to the invention are described below in conjunction with the drawing, which is a perspective schematic representation of an open submergible vehicle in accordance with the invention.

In the drawing a submergible house is generally designated by 1, and is adapted to be securely placed on the sea bottom by means of its legs 2. The house has an interior space for the quarters of the crew and at its front and back are two ballast tanks 3 and 4 that serve for the controlled lowering and raising of the vehicle. An entrance tube 5 is provided in the bottom of the house and can be closed from the inside of the house by a lid 6. A wet room 7 and a workspace 8 form the life sustaining quarters in the house.

A cable 9 runs through the wet room, one end being connected to a depth control body 10, while the other end runs over a winch 11. The cable 9 includes suitable conduits and electrical lines to bring the materials stored in the depth control body to the quarters in the house. As shown in the drawing, the cable is led around a pulley 12 which is suspended from the ceiling 13 of the house. A spring balance 14 is interposed between the bearings of the pulley and its suspension point in the ceiling.

The installation is used as follows: after the depth control body 10 has been lowered, the ballast tanks 3 and 4 are flooded until the upward force of the house is less than the underwater weight of the depth control body 10. The house is then pulled down to the depth control body by means of the winch 11. During this trip the house can be stopped at any desired depth to investigate water characteristics.

It is very difficult to determine the start of the sinking of a house especially in the presence of waves from a running sea. However, with the apparatus of this invention commencement of a descent may be accurately sensed by monitoring the tension of the cable 9 from which the depth control body 10 is suspended. In fact, as soon as the ballast tanks 3 and 4 are filled with a sufficient quantity of water to lower the upward force of the house below the underwater weight of the depth control body 10, the exact upward force may be accurately determined. If the upward force of the house is greater than the weight of the body 10, then the body is lifted upwards by the winch.

Instead of the spring balance 14, other technically equivalent instruments can be used to measure the cable tension at the winch. Instead of the winch, other means can be used to effect a relative movement between the depth control body and the house.

After lowering of the house upon the sea bottom, the depth controlling function of body 10 is no longer required. The ballast tanks 3 and 4 are then filled, and the space 15 inside body 10 may then serve as a supply of drinking water. Alternatively, the body 10 may also be flooded with seawater, though filling body 10 with potable water is preferred.

In order to obtain a negative buoyancy of the depth control body, batteries 16 are placed therein. Batteries 16 advantageously supply light and serve as an emergency current source. A charging device 17 for the batteries is provided. In a calm sea the charging of the emergency batteries can be done to guarantee a supply of energy to the house during stormy weather.

Additional depth limiting bodies 18 are connected to hooks 20 on top of the house by means of cables 19. These auxiliary bodies 18 provide a lifting force which aids in the controlled lowering of the vehicle and maintain the house at preselected depths for safety and investigating purposes until the ballast tanks are further flooded. A multiple of bodies 18 can be attached to the top of the house at distances that determine the desired depth intervals. These bodies provide an additional safety in the event the ballast tanks malfunction.

Having thus described an embodiment of the invention its advantages may be appreciated. The scope of the invention is not to be limited by the embodiment and its description from which variations may be made without escaping the scope of the following claims.

What is claimed is:

1. A submergible vehicle for underwater work characterized by an ability to accurately and controllably descend and ascend comprising a first component in the form of a submergible main housing enclosing human life sustaining quarters which are in open pressure communication with the surrounding body of water through an open human entrance port located in the bottom of the housing, said first component having a variable buoyancy, a separately mobile dependently supported second component in the form of a submergible depth control body of a predetermined underwater weight acting as a ballast sufficient to submerge said first component when the buoyancy thereof is altered to a low level, said second component containing as ballast at least a portion of the support material necessary to support the main housing, cable means extending through an open cable entrance passage located in the bottom of the housing for attaching said first and second components for precisely varying the vertical distance between the first and second components when said first component has a preselected but lesser buoyancy relative to the underwater weight of the second component to accurately control the depth of the living quarters, and conduit means for connecting said second component to the first component to transport therebetween as desired, said support material when the main housing rests upon the bottom of the body of water.

2. A submergible vehicle for underwater work characterized by an ability to accurately and controllably descend and ascend comprising a first component in the form of a submergible main housing enclosing human life sustaining quarters in open pressure communication with the surrounding body of water, a separately mobile dependently supported second component in the form of a submergible depth control body of a predetermined underwater weight and containing at least a portion of the support material necessary to support the main housing, means attaching said first and second components for precisely varying the vertical distance between the first and second components when said first component has a preselected but lesser buoyancy relative to the underwater weight of the second component to accurately control the depth of the living quarters, and means connecting said second component to the first component to transport therebetween, as desired, said support material when the main housing rests upon the bottom of the water, said means for varying the vertical distance including cabling means interconnecting the first and second components and wherein the vehicle further comprises means for sensing the tension in the cabling means, means for altering the buoyancy of the first component, whereby the buoyancy of the first component can be accurately related to the underwater weight of the second component by sensing the tension in the cabling means for controlling the underwater descent of the first component.

3. The submergible vehicle as claimed in claim 1 wherein the second component includes a floodable sealed chamber for retaining a supply of fresh water to support the housing.

4. The submergible vehicle as claimed in claim 3 wherein the second component further includes a compartment sized to retain batteries for support of the housing.

5. The submergible vehicle as claimed in claim 1 and further including means mounted on top of the first component for establishing limits on the depth of submergence of the main housing.

6. The submergible vehicle as claimed in claim 5 wherein said housing depth limiting means includes buoyant lifting bodies and cables interconnecting the buoyant lifting bodies to the housing.

7. The submergible vehicle as claimed in claim 2 wherein the tension sensing means includes a spring scale operatively interposed between the cabling means and the housing.

8. A method of controlling the depth of submergence of a housing in a body of water comprising the steps of attaching a body having a predetermined underwater buoyancy to the housing with a retractable cable, sensing the tension in the retractable cable, altering the buoyancy of the housing to a level having a predetermined relationship with the sensed tension in the cable, and varying the length of the retractable cable to control the depth of the housing relative to the body.

9. The method of controlling the depth of submergence of a housing in a body of water as claimed in Claim 8 and further including the steps of weighting the body to a predetermined negative buoyancy, and reducing the buoyancy of the housing to a level below the underwater weight of the body.

10. The method of controlling the ascent and descent of a housing in a body of water comprising the steps of attaching a body having a predetermined underwater buoyancy to the housing with a retractable cable, suspending the body with said cable off the bottom of the body of water, sensing the tension in the retractable cable while the body is suspended, altering the buoyancy of the housing to a level having a predetermined lesser relationship with the sensed tension produced by the suspended body, and varying the length of the retractable cable to control the depth of the housing relative to the body.

11. The method of controlling the ascent and descent of a housing in a body of water as claimed in Claim 10 further including the step of sensing the tension in the retractable cable while at different depths of the housing relative to the body, thereby to monitor the housing buoyancy during ascent or descent.

12. The method of controlling the ascent and descent of a housing in a body of water as claimed in Claim 10 wherein after descent, said body changes its buoyancy, and wherein said suspending step comprises, prior to ascending, suspending said body having changed buoyancy.

13. A submergible vehicle for underwater work characterized by an ability to accurately and controllably descend and ascend comprising a first component in the form of a submergible main housing enclosing human life sustaining quarters in open pressure communication with the surrounding body of water, a separately mobile dependently supported second component in the form of a submergible depth control body of a predetermined underwater weight, means attaching said first and second components for precisely varying the vertical distance between the first and second components when said first component has a preselected but lesser buoyancy relative to the underwater weight of the second component to accurately control the depth of the living quarters, and means for sensing the tension in said attaching means, whereby the difference between the buoyancy of the first component and the underwater weight of the second component can be monitored for controlled ascent and descent of the pressure communicating first component.

14. A submergible vehicle for underwater work as claimed in claim 13 further comprising
means for altering the buoyancy of the first component to adjust the difference between the buoyancy of the first component and the underwater weight of the second component to a predetermined level.

15. A submergible vehicle for underwater work as claimed in claim 13 further comprising
means for altering the buoyancy of the second component when the main housing rests on the bottom of the body of water.

16. A submergible vehicle for underwater work as claimed in claim 13 wherein the tension sensing means includes a spring scale operatively interposed between the cabling means and the housing.

* * * * *